June 23, 1970 A. F. TREMBLAY Re. 26,914

APPARATUS FOR PRODUCING GEAR TEETH OR THE LIKE

Original Filed Sept. 16, 1963 5 Sheets-Sheet 1

INVENTOR.
ALBERT F. TREMBLAY
BY
James H. Bower
ATTORNEY

APPARATUS FOR PRODUCING GEAR TEETH OR THE LIKE

Original Filed Sept. 16, 1963 5 Sheets-Sheet 2

INVENTOR.
ALBERT F. TREMBLAY
BY
James H. Bower
ATTORNEY

APPARATUS FOR PRODUCING GEAR TEETH OR THE LIKE

Original Filed Sept. 16, 1963 5 Sheets-Sheet 3

INVENTOR
ALBERT F. TREMBLAY
BY
James H. Bower
ATTORNEY

APPARATUS FOR PRODUCING GEAR TEETH OR THE LIKE

Original Filed Sept. 16, 1963 5 Sheets-Sheet 4

INVENTOR
ALBERT F. TREMBLAY
BY
James H. Bower
ATTORNEY

APPARATUS FOR PRODUCING GEAR TEETH OR THE LIKE

Original Filed Sept. 16, 1963 5 Sheets-Sheet 5

INVENTOR
ALBERT F. TREMBLAY
BY
James H. Bower
ATTORNEY

United States Patent Office

Re. 26,914
Reissued June 23, 1970

26,914
APPARATUS FOR PRODUCING GEAR TEETH OR THE LIKE

Albert F. Tremblay, Toledo, Ohio, assignor to Kent-Owens Machine Company, Toledo, Ohio, a corporation of Ohio Original No. 3,292,405, dated Dec. 20, 1966, Ser. No. 309,121, Sept. 16, 1963. Application for reissue Mar. 18, 1968, Ser. No. 717,479
Int. Cl. B68g *7/03*
U.S. Cl. 72—216 14 Claims

Matter enclosed in heavy brackets [ ] appears in the original patent but forms no part of this reissue specification; matter printed in italics indicates the additions made by reissue.

The present invention relates to a method and apparatus for forming workpieces to a predetermined configuration; and more particularly to a novel method and apparatus for forming gears, splines, and the like, to provide extremely smooth surface finishes.

Various types of apparatus have been proposed heretofore for producing gears and the like by means of a work forming roll which is embedded into the workpiece with substantially a true rolling action. One such apparatus is shown and described in my prior Patent 3,096,669 wherein the machine was constructed so that the metal forming roll had substantially true rolling contact at its point of maximum penetration into the workpiece. This was done deliberately so that there would be substantially no slipping between the roll and gear blank which would produce friction and thus galling of the teeth produced by the apparatus. The gear teeth produced by the apparatus described in Patent 3,096,669 had a surface finish, when using a highly polished rolling tool, of approximately 40 R.M.S.

According to the present invention I have found that by providing apparatus wherein the work forming tool is embedded into the work blank with both a rolling and sliding action, the work forming tool will provide a contoured surface to the work blank which is burnished to a smoother finish than can be achieved even by grinding methods, and in fact produces a surface finish that is smooth to from 2 to 8 R.M.S. I have further found that by producing a gear using my improved rolling and sliding action to form the root of the gear, the root is not only work hardened, but is given a super-finish which makes the gear considerably stronger than those produced by prior cut gear forming methods and consequently allows gears for given applications to be reduced in size.

An object of the present invention is the provision of a new and improved method and apparatus for shaping the surface of a work piece which simultaneously work hardens and burnishes the surface of the work pieces.

Another object is the provision of a new and improved rolling tool which simultaneously work hardens and burnishes rough cut teeth to very accurate contours.

A further object of the invention is the provision of a new and improved means and apparatus for forming gear teeth and the like wherein the roots of the teeth are simultaneously work hardened and burnished.

A still further object of the invention is the provision of a new and improved method of, and apparatus for, shaping metal by a rolling operation which simultaneously burnishes the metal to a very smooth surface finish.

Another object is the provision of a new and improved tool for use in my novel rolling and burnishing process which allows the tool to be reground repeatedly to compensate for wear.

Another object of the invention is the provision of a new and improved holder for a rolling tool which will hold the rolling tool precisely in a given position even when the rolling tool is subjected to extremely high compressive loads.

Another object of the invention is the provision of a new and improved gear tooth rolling and burnishing tool which accurately spaces the teeth as it finishes the teeth.

A further object of the invention is the provision of new and improved gears, the roots of the teeth of which are both cold worked and burnished.

Further objects and advantages of the invention will become apparent to those skilled in the art to which the invention relates from the following description of several preferred embodiments of the invention described with reference to the accompanying drawings forming a part of this specification, and in which:

FIGURE 3 is an enlarged sectional view taken approximately on the line 3—3 of FIGURE 1;

Figures 1, 2:
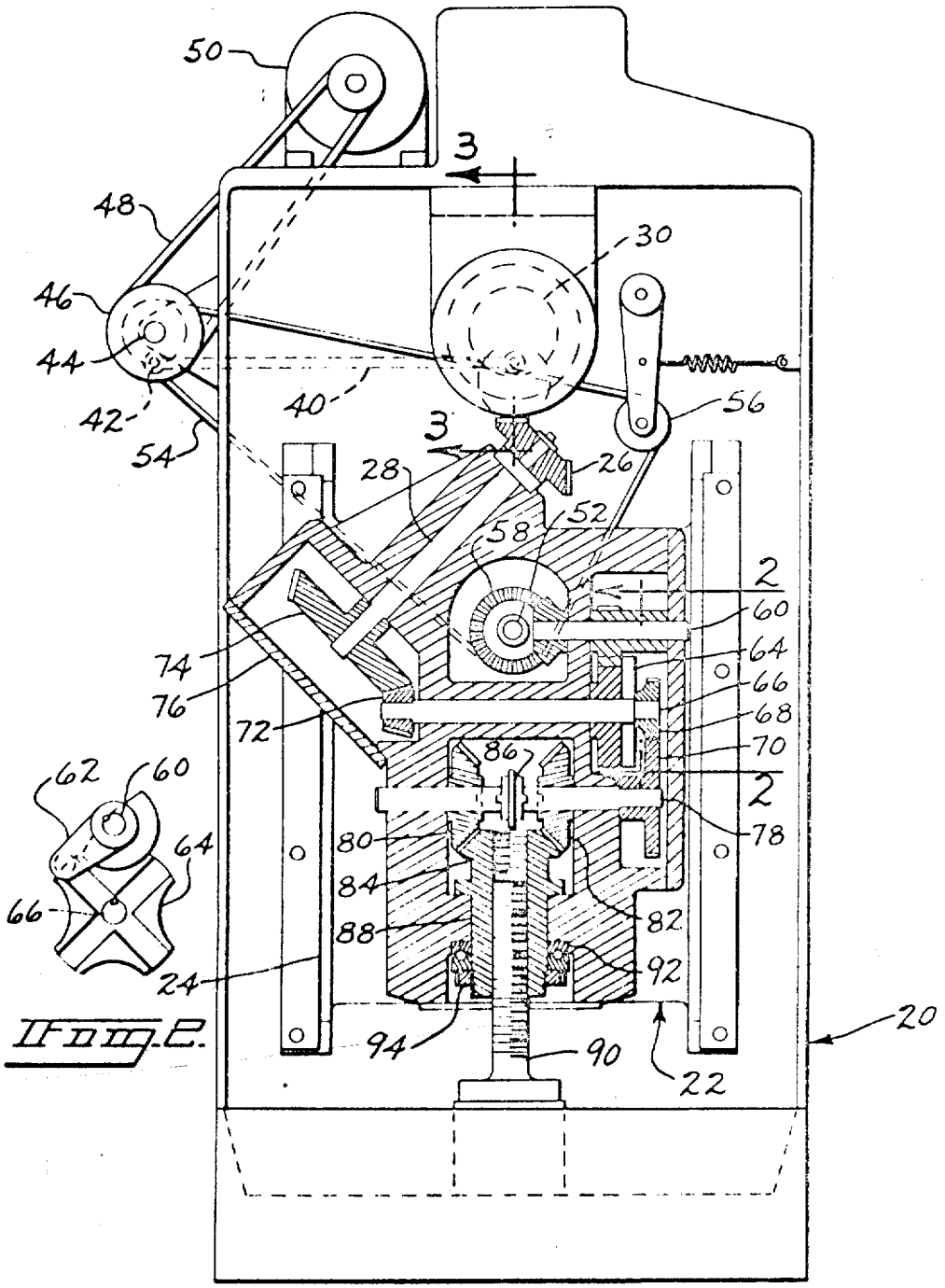
FIGURE 1 is a front elevational view, with parts in section and parts broken away, of a machine embodying the invention for carrying out my novel method.
FIGURE 2 is a section taken approximately on line 2—2 of FIGURE 1.
Figure 5:
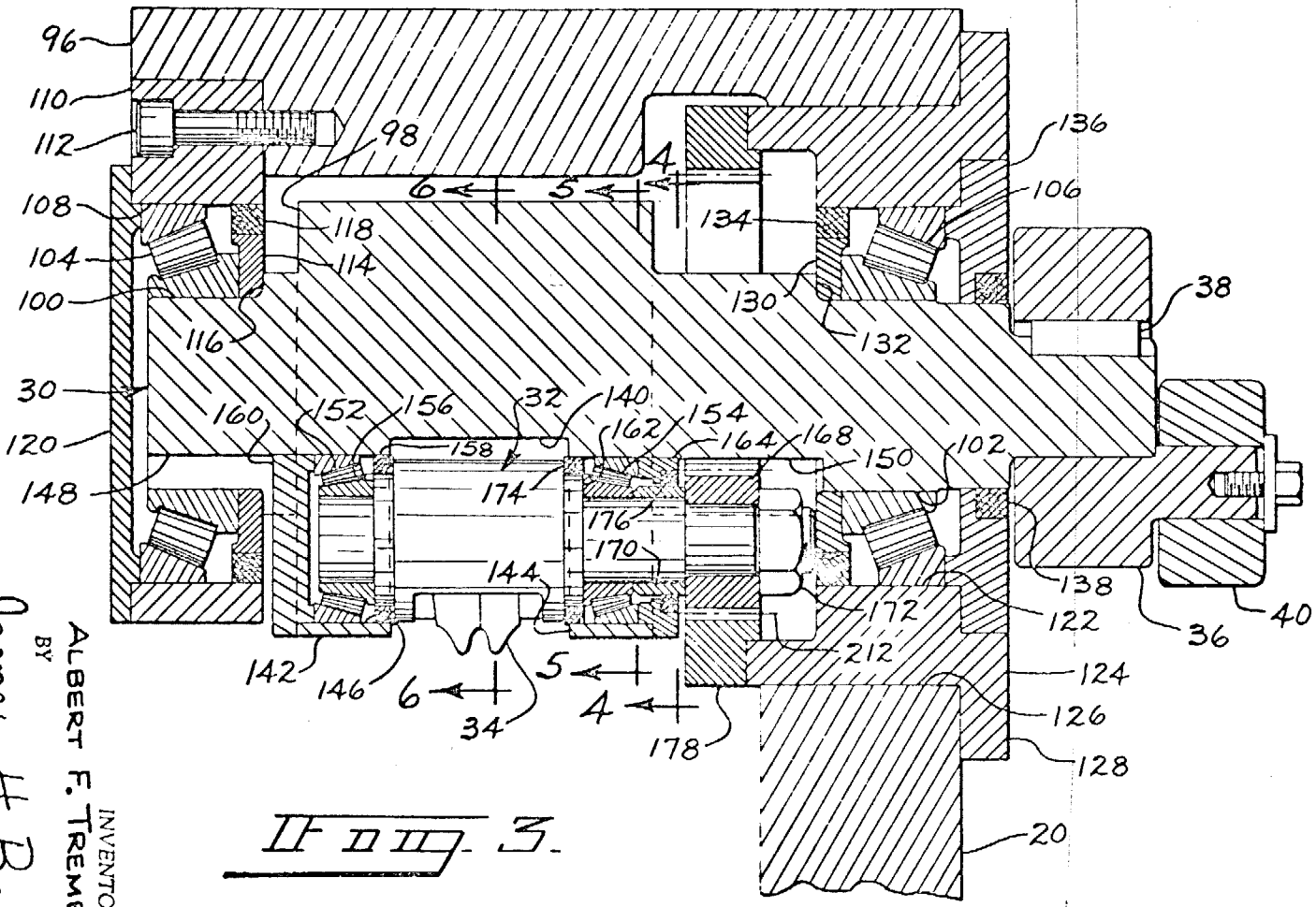
FIGURE 5 is a sectional view taken approximately on the line 5—5 of FIGURE 3.
Figure 5:
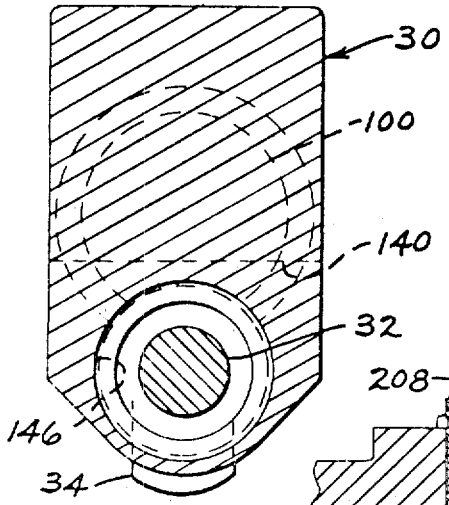
Figure 9:
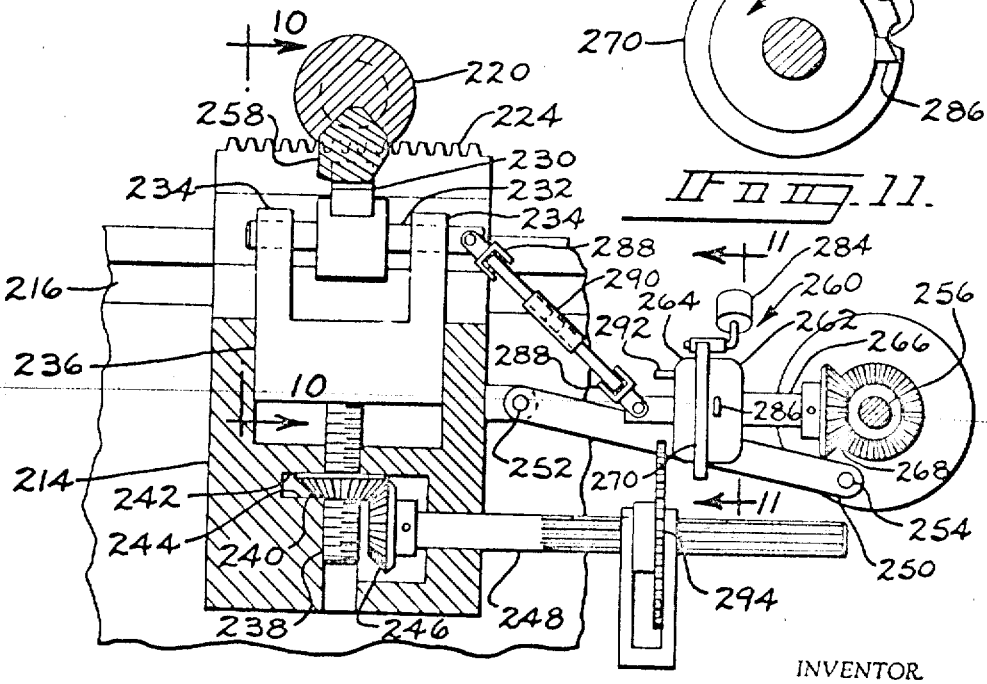
FIGURE 9 is a diagrammatic view of another embodiment of a machine for carrying out my novel method.

The machine shown in FIG. 1 is quite similar to that shown in FIGURE 9 of the A. F. Tremblay Patent 3,096,669, but differs therefrom principally in that the machine of the present invention causes its rolling tool to engage the work blank at a position considerably below the pitch diameter of the internal ring gear along which the pinion gear which rotates the work forming tool rolls. This produces a significant amount of sliding of the tool across the work piece during the rolling action of the tool.

The machine shown in the drawings and described hereafter is for purposes of illustrating the invention and a preferred embodiment. While the machine is described in detail, it should be expressly understood that numerous changes may be made therein, insofar as the details of construction and operation are concerned.

The machine shown in FIGURE 1 comprises a frame 20 on which a lower work driving and carrying sub-frame 22 is mounted for guided vertical movement in gibs 24.

The machine shown is designed to form bevel gears, a gear blank 26 which is mounted on the upper end of an inclined shaft 28 which is journaled in and projects upwardly out of the top of the sub-frame 22.

The frame 20 also carries a horizontal tool head 30 that is journaled above the gear blank 26 for oscillating movement. As best seen in FIGURE 3, the tool head 30 journals a tool supporting spindle 32 having a rolling tool 34 mounted thereon for an oscillating rolling action across the face of the gear blank 26, as will later be described in detail. The tool head 30 is caused to oscillate by a crank arm 36 keyed to the tool head 30 as at 38 and actuated by a connecting rod 40. The other end of the connecting rod 40 is pinned as at 42 to a crank arm, not shown, fixed to a horizontal shaft 44 journaled to the side of the frame 20. The horizontal shaft 44 is rotated by a pulley 46, V-belt 48, and motor 50 that is mounted on top of the frame, and the crank arm supporting the pin 42 is shorter than the crank arm 36 so that rotation of the shaft 44 produces oscillation of the tool head 30.

The work blank 26 must be indexed to bring a new area of the blank under the rolling tool 34 during the time that the rolling tool 34 is out of engagement with the work blank 26. The mechanism in the sub-frame 22 for indexing the work blank 26 is driven by a shaft 52 which in turn is driven by the shaft 44 by any suitable synchronous drive means, such as a drive chain 54. A spring-biased slack take-up roller 56 is used to keep the drive chain 54 tight during movement of the sub-frame 22 toward the work blank 26, as will later be described.

The shaft 52 drives a bevel gear set 58, the output shaft of which is designated 60. Output shaft 60 therefore rotates in a definite timed relationship with the oscillation of the tool head 30. Shaft 60 carries a Geneva driver dog 62 (FIG. 2) which meshes with a star wheel 64 to provide intermittent motion to a back shaft 66. Back shaft 66 has two driven gears keyed thereto, one of which, designated 68, meshes with a sub-frame elevating feed gear 70, and the other of which is a bevel gear 72 which meshes with a companion bevel gear 74 that turns the shaft 28 on which the gear blank 26 is mounted. The bevel gear set 72 and 74 is accessible beneath a cover plate 76 and can be changed to provide different indexing distances and thus different tooth spacing on the work blank 26.

The sub-frame elevating feed gear 70 drives a shaft 78 on which forward and reverse bevel gears 80 and 82 are mounted for free rotation, and both of which are in constant mesh with opposite sides of a bevel gear 84. A clutch 86 keyed to the shaft 78 and slidable thereon causes driving engagement between the shaft 78 and either of the forward and reverse bevel gears 80 and 82, so that one or the other may be coupled to transmit power to the bevel gear 84 to cause elevation or depression of the workpiece 26 relative to the forming head. Bevel gear 84 is keyed to or made a part of a feed nut 88 which receives a stationary feed screw 90 extending upwardly from the base of the main frame 20. The weight of the sub-frame 22 is transmitted to the feed nut 88 by a conventional ball thrust bearing 92 which in turn transmits the weight to the feed nut through a take-up nut 94 threaded to the bottom of the feed nut.

It will thus be seen that the back shaft 66 is indexed 90 degrees by the Geneva drive dog 62 once during each revolution of the shaft 60, and that during this indexing operation, the work blank 26 is indexed a distance of one tooth, the spacing of which is dependent upon the ratio of the bevel gears 72 and 74. It will also be seen that upon each indexing of the back shaft 66, the work blank will be raised by an increment which depends upon the ratio of gears 68 and 70, 80 and 84, and the lead of the feed nut 88 and feed screw 90. This increment of feed will usually equal the total penetration that is desired of the rolling tool 34 into the work divided by the number of teeth to be formed. The penetration of the tool into the workpiece during each pass of the tool will usually be only a fraction of the total depth of the tooth to be formed so that a number of rotations of the workpiece 26 is required before the final desired depth of tooth is achieved. When one of the teeth being formed reaches the final depth, the clutch 86 is disengaged from the gear 80 and all of the teeth are then rolled to the same depth.

The tool head 30 is mounted in a head portion 96 of the frame 20 which extends horizontally over the work blank 26. The tool head 30 has a heavy center section 98 of generally rectangular cross section, and cylindrical opposite end portions 100 and 102 which receive the inner races of front and rear roller bearings 104 and 106 respectively. The outer race of the front roller bearing 102 is pressed into the central opening 108 of a support ring 110 that is secured to the front of the head portion 96 of the frame by machine screws 112, only one of which is shown. A metal washer 114 is confined between the back of the inner race of the front roller bearing 104 and a shoulder 116, and a felt washer 118 is cemented to the outside of the washer 114 to provide an inner dirt seal for the bearing 104. The outer race of the roller bearing 104 is held in place by a cover member 120 secured to the support ring 110 by machine screws (not shown).

The outer race of the rear roller bearing 106 is pressed into the central opening 122 of a rear support ring 124. The rear support ring 124 is tightly fitted into an opening 126 in the back of the frame 20 and is held in place by a flange 128 and suitable machine screws (not shown). A metal spacing washer 130 is positioned between the inner race of rear roller bearing 106 and shoulder 132, and a dust and lubricant protecting felt washer 134 is cemented to the outside of the washer 130 to provide an inner dirt seal for the bearing 106. The outer race of the bearing 106 is held in place by an annular retainer washer 136 and machine screws (not shown), and a felt washer 138 is provided for an outer dirt seal for the bearing 106. Opposite endwise movement of the tool head 30 is prevented by oppositely facing shoulders 116 and 132, roller bearings 104 and 106, and cover member 120 and retainer washer 136.

Figure 4:
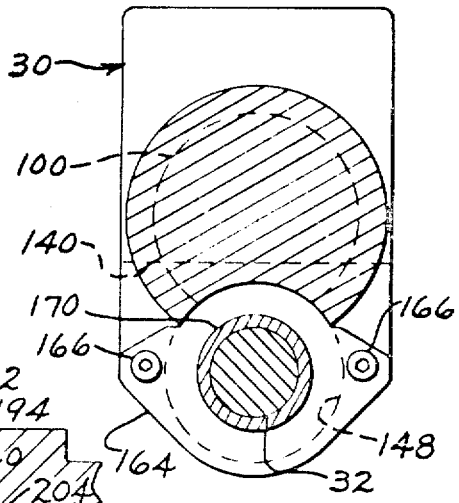
FIGURE 4 is a sectional view taken approximately on the line 4—4 of FIGURE 3.

The bottom of the center section 98 is milled away for approximately one-half of its height to provide a transverse recess 140 separating downwardly extending front and rear leg portions 142 and 144 respectively. A longitudinally extending bore 146, generally centered in the leg portions 142 and 144, extends from the front of the tool head 30 to the rear cylindrical portion 102 and removes an arc shaped portion 148 on the bottom of the cylindrical front end portion 100, and a similar arc shaped portion 150 to rear of the leg 144. The front and rear of the tool supporting spindle 32 are of reduced diameter and are mounted in the bore 146 in the front and rear legs 142 and 144 by roller bearings 152 and 154 respectively. The inner race of the front roller bearing 152 is seated against a shoulder 156 on the spindle, and an annular felt washer 158 is positioned between the spindle 32 and the sidewalls of the bore 148 to provide an inner dirt seal for the bearing 152. The outer race of the front bearing 152 is held against forward movement by a closure member 160 held in place by machine screws (not shown). The inner race of the roller bearing 154 is seated aaginst a rearwardly facing shoulder 162 and the outer race of the bearing is held against rearward movement by a retainer 164 secured to the leg 144 by machine screws 166 (see FIG. 4). The tool supporting spindle is oscillated in its bearings by a pinion gear 168 that is keyed to the rear of the spindle 32. The pinion gear 168 is locked in place by an annular spacer 170 positioned between the inner race of bearing 154 and the gear 168, and by the hold-down nut 172. An annular felt dirt seal 174 is provided between the spindle 32 and sidewalls of the bore 148 on the front of the bearing, and another felt dirt seal 176 is provided between the retainer 164 and the spacer 170. The pinion gear 168 meshes with an internal ring gear 178 secured to the stationary rear support ring 124, so that oscillating movement of the tool head 30 in its bearings 104 and 106 produces another type of oscillation of the spindle 32 in its bearings 152 and 154.

Figure 6:
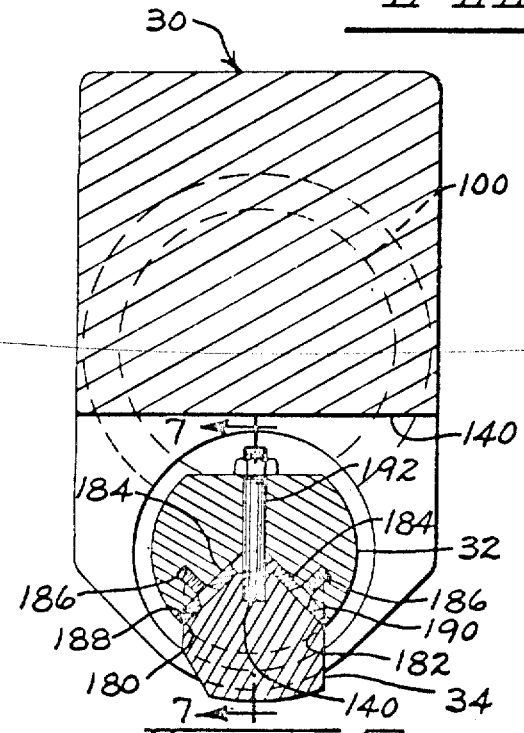
FIGURE 6 is a sectional view taken approximately on the line 6—6 of FIGURE 3.
Figure 7:
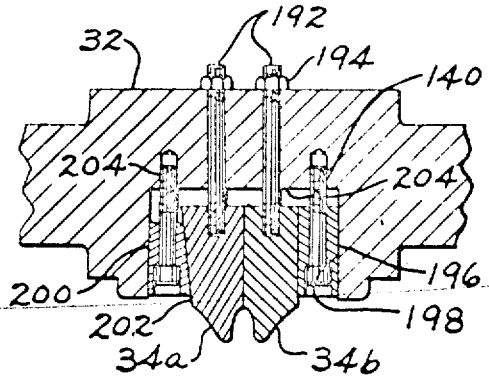
FIGURE 7 is a fragmentary sectional view taken approximately on the line 7—7 of FIGURE 6.

The rolling tool 34 is supported in the tool supporting spindle 32 as best seen in FIGURES 6 and 7. The center section of the spindle 32 which is positioned in the recess 140 has a 90° sector removed to form an opening with tool abutment surfaces 180 and 182 positioned at 90° to each other. Identical hardened shims 184 are fastened to the abutment surfaces 180 and 182 by machine screws 186, and the rolling tool 34 is provided with abutment surfaces 188 and 190 that form a 90° angle with respect to each other and which abut the shims 184. The tool 34 shown in FIGURES 3, 6 and 7 is formed in two half sections 34a and 34b, each of which are held against the shims 184 by a respective one of a pair of studs 192 that extend up through the spindle and have a nut 194 tightened against the top surface of the spindle 32. Endwise separation of the tool sections 34a and 34b is prevented by a flat spacer 196 positioned between the rear end face 198 of the tool opening of the spindle and the section 34b, and a wedge shaped spacer 200 positioned between the front of the tool opening and a matching tapered surface 202 of the tool section 34a. The spacers 196 and 200 are held in place by machine screws 204, and by drawing the wedge shaped spacer 200 firmly in place, separation of the tool sections 34a and 34b is prevented. By forming the tool 34 in two half sections, wear of the tooth forming surfaces can be compensated for by a slight truing up of the tooth forming surfaces, removing metal from the abutting surfaces of the two half sections, and again wedging them together.

Figure 8:
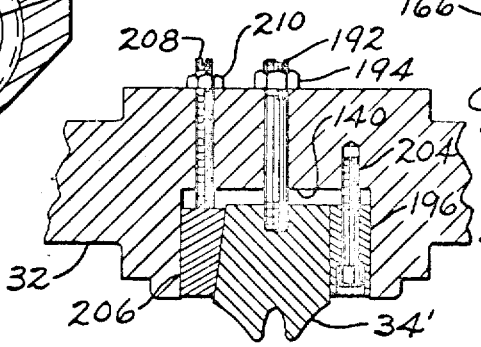
FIGURE 8 is a fragmentary sectional view similar to FIGURE 7 but showing another embodiment of tool and tool holder assembly.

FIGURE 8 of the drawings shows another embodiment of rolling tool 34'. The rolling tool of FIGURE 8 is made in a single piece and is held against shims 184 by a single stud 192 and nut 194. It uses a flat spacer 196 and machine screw 204 identical with that of the previously described embodiment, but utilizes a tapered spacer 206 which converges toward its outer end. The tool 34' of FIG. 8 has a matching tapered surface, and the tool 34' is wedged in place by a threaded machine screw 208 which abuts the inner face of the spacer 206 to force it outwardly. The screw 208 is locked against rotation by a jam nut 210. It will be seen that the taper of the spacer shown in FIG. 8 helps resist upward movement of the tool 34'. Both the rolling tool 34' of FIG. 8 and the rolling tool 34 of FIGS. 6 and 7 are made, so that their entire tooth forming surface is positioned below the pitch diameter 212 of the internal ring gear 178. The entire tooth forming surface and particularly the portion forming the root of the gear teeth slides, therefore, as it rolls across the work blank 26. Inasmuch as the tool supporting spindle 32 of the machine so far described moves in an arcuate path relative to the work blank 26, the rolling surface of tools 34 used therein are cam shaped with the leading and trailing portions of the tools 34 being positioned farther away from the center of the spindle 32 than is the center of the tools. The contour of the tools is so shaped that the root of the teeth formed thereby is a straight line.

The operation of the machine so far described will usually begin with the sub-frame 22 lowered to a position where a gear blank 26, when placed on the shaft 28, is out of contact with the rolling tool 34. The tool head 30 will be rotated into a position wherein the tool 34 is positioned generally to the left, as seen in FIG. 1, of the position which the gear blank 26 is to occupy. Gear blank 26 is then affixed to the upper end of the shaft 28 and the motor 50 started. Inasmuch as the crank arm connecting the left end of the connecting rod 42 to the shaft 44 is shorter than is the crank arm connecting the right end of the connecting rod 42 to the axis of the tool head 30, rotation of the shaft 44 causes the tool 34 to move from a position to the left of the gear blank 26 across the tool blank to a position free and clear of the right hand side of the gear blank 26. The drive mechanism connecting the shaft 44 with the shaft 52 and the sub-frame 22 is such as to provide a 1:1 drive ratio. The connection of the connecting rod 42 to the tool head 30 is such that the rolling tool 34 stays out of contact with the gear blank 26 during approximately 120° of rotation of the tool head 30. During this 120° of rotation wherein the rolling tool is out of engagement with the gear blank 26, the Geneva drive dog 62 moves into a slot of the star wheel 64 and rotates the shaft 66 approximately 90° during a corresponding 90° movement of the tool head 30. The ratio of the pinion 72 and 74 is such that the rotation of the shaft 66 by 90° indexes the gear blank 26 by a distance corresponding to the spacing of one tooth. Also during the time that the rolling tool 34 is out of engagement with the gear blank, the rotation of the shaft 66 by approximately 90° rotates the shaft 78 by an amount depending upon the gear ratio of the gears 68 and 70; and with the clutch 86 in engagement with the left hand pinion gear 80, rotation of the feed nut 84 moves the sub-frame 22 and gear blank 26 upwardly by a small increment. The feeding movement of the sub-frame 22 is preferably such during each revolution of the shaft 52 that it equals the maximum desired depth of penetration of the tool 34 into the gear blank divided by the number of teeth to be formed on the gear blank 26. During the first revolution of the shaft 26, therefore, the blank is rolled at each tooth location to a progressively greater depth, and during each succeeding rotation of the shaft 28, each tooth is rolled deeper by the desired amount. When the tooth first started to be formed reaches its final heighth, the clutch 86 is disengaged, and during the next rotation of the shaft 28 each of the teeth are rolled to the same final depth.

During each oscillation of the tool head 30, the pinion gear 168 which drives the tool supporting spindle 30 rolls along the teeth of the internal ring gear 178, so that there is substantially a pure rolling contact between the pinion and the internal ring gear along the arcuate pitch line 212. According to the invention, the tool supporting spindle 32 and rolling tool 34 are so formed that all of the tooth forming surfaces of the tool 34 are positioned to one side of the pitch line 212, and preferably to the opposite side of the pitch line 212 from the center line of the spindle 32, so that true rolling contact does not exist between the surface of the rolling tool 34 and any part of the surface of the gear blank into which it is embedded. It has been thought heretofore that substantially true rolling contact of the rolling tool with the work is desirable to prevent sliding friction and galling; but according to the invention it has been found that by providing a controlled sliding movement of the rolling tool relative to the work as the rolling tool is pressed down into the work, an extremely beneficial forming and burnishing action is produced which results in surface finishes that are smooth to about 2 to 8 R.M.S. In the preferred embodiment shown in the drawings, the portion of the rolling tool 34 which forms the root of the thread is positioned from the pitch line 212 so as to have the greatest amount of burnishing action, thereby to produce gear teeth the root of which is both work hardened and polished to an extremely smooth finish.

The forces transmitted between the rolling tool 34 and the tool supporting spindle 32 are, of course, quite great, and the construction of the tool and supporting spindle 32 as shown in FIGS. 6 and 7 has particular advantages. The rolling tool 34 is, of course, made of extremely hard material while the spindle 32 will usually be made of a tough but non-hardened material. By ising shims 184 that have been hardened, wear of the ibutment surfaces 180 and 182 of the spindle 32 is ivoided, and, in addition, shims 184 of increasing thickness can be substituted as wear of the rolling surfaces of the rolling tool 34 necessitates a regrinding of these ooth forming surfaces. By utilizing abutment surfaces 180 and 182 in the work spindle 32 that are at approximately 90° to each other, the component of force between the surface of the rolling tool 34 and the work vill at all times produce a wedging action of the tool igainst the shims 184 and prevent the retaining stud or tuds 192 (as the case may be) from being placed under ension.

By making the rolling tool 34 in two half-sections 34a ind 34b metal can be removed from the abutting surfaces of the half-sections 34a and 34b to compensate for wear of their tooth-forming surfaces to thereby permit the tool o be reground a greater number of times than can one vhose entire surface must be reshaped and deepened during its regrinding operation. By utilizing a wedge of he type shown at 206 in FIG. 8, a tightening action is produced between the tool 34' and the wedge 206 during rolling contact of the tool 34' with the workpiece.

As previously indicated, improved surface finishes are produced by providing a sliding action between the rolling tool and the workpiece along the surfaces where deformation of the workpiece takes place during the rolling ction of the tool. This sliding action therefore takes place along the surfaces of the tool and workpiece where he maximum compressive force is produced. This type of action cannot only be produced by a machine of the ype above described wherein the spindle which mounts he rolling tool is rolled along the teeth of an arcuate gear, but can also be produced by other types of mechanisms which will produce this rolling sliding action, such is may be produced by tools mounted in spindles that are given a linear motion component and rotated by a rack and pinion arrangement. One such embodiment is shown diagrammatically in FIGS. 9–11 of the drawings.

Figure 10:
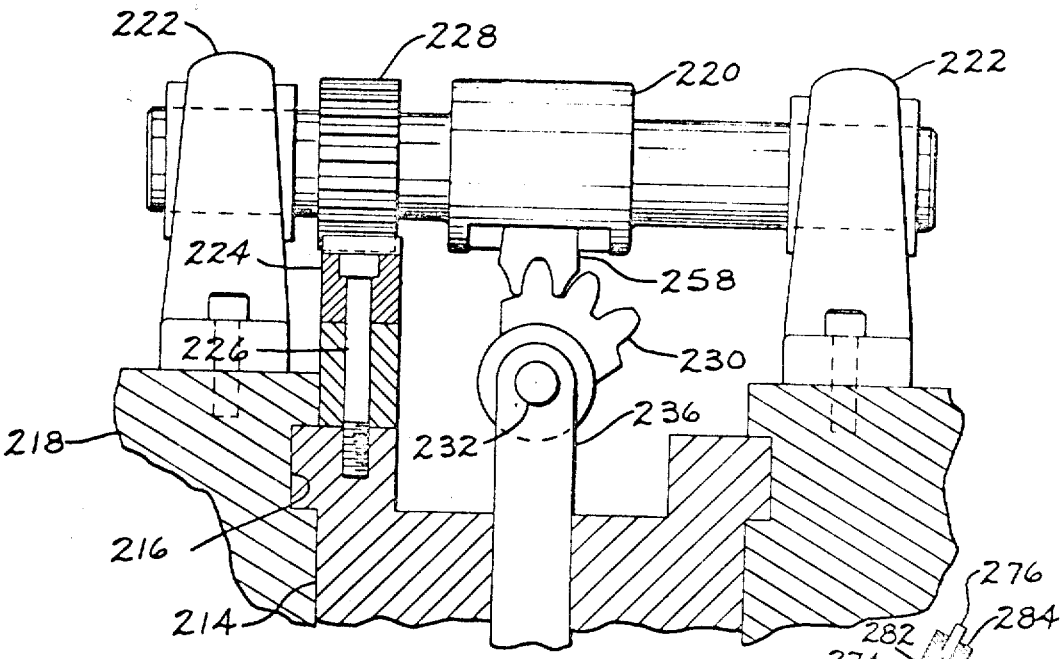
FIGURE 10 is a sectional view taken approximately on the line 10—10 of FIGURE 9.
Figure 11:
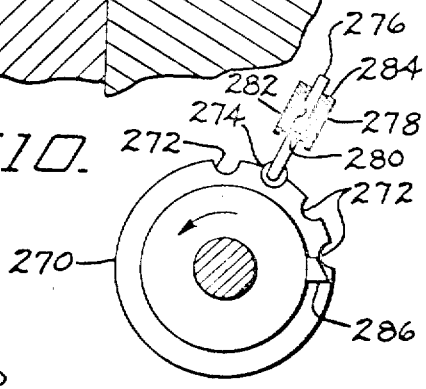
FIGURE 11 is a sectional view taken approximately on the line 11—11 of FIGURE 9.

In the machine shown in FIGS. 9–11, a carriage 214 s mounted in suitable guideways 216 for reciprocating straight line motion with respect to a frame 218. A tool supporting spindle 220 quite similar to the spindle 32 previously described is mounted laterally across the carriage 214 by a pair of identical pillow blocks 222, respective ones of which are positioned on opposite sides of he carriage. A rack 224 is securely fastened to the carriage 214 by means of a plurality of machine screws 226 (only one of which is shown) and a pinion gear 228 ixed to the tool supporting spindle 220 is mounted for engagement by the rack 224. Upon reciprocatory motion of the carriage 214 in the frame 218, therefore, the ool supporting spindle 220 is caused to oscillate about ts central axis.

The machine shown in FIGS. 9–11 is specifically intended to work harden and burnish the rough cut teeth of segmental gears such as are used for the pinion gears of automotive power steering mechanisms. The segmental gear or workpiece 230 as shown in the drawing has three teeth which are to be work hardened and burnished.

The gear sector 230 is mounted on, or is an integral part of, a shaft 232 which is easily installed and removed from bearings 234 positioned on opposite sides of the gear sector. The shaft 232 extends parallel to the line of movement of the carriage 214, and the bearings 234 are carried by a vertical support 236 which is non-rotatably held by the carriage 214, but which can be raised and lowered as by a vertical feed screw 238 non-rotatably fixed to the bottom of the vertical support 236. A thrust nut 240 in the form of a pinion gear is supported between a pair of oppositely facing shoulders 242 and 244 to support the feed screw 238, and the thrust nut 240 is adapted to be rotated by a companion pinion gear 246 that is driven by a horizontal shaft 248.

The carriage 214 is adapted to be reciprocated beneath the tool-supporting spindle 220 by means of a connecting rod 250, one end of which is pinned to the carriage 214, and the other end of which is pinned as at 254 to a crank arm fixed to a transverse drive shaft 256. Upon rotation of the drive shaft 256, therefore, the carriage 214 is moved forwardly and backwardly beneath the tool supporting spindle 220. The mechanism is shown in FIG. 9 in a position just after the carriage 214 has begun its backward stroke, and the rolling tool 258 has already passed over a fraction of the workpiece 230. After the workpiece 230 is moved rearwardly of the plane passing through the center line of the work spindle 220, and the rolling tool 258 has been rotated counterclockwise out of engagement with the workpiece 230, the workpiece 230 must be indexed to bring the next tooth of the workpiece 230 into position for engagement by the rolling tool 258. Any suitable mechanism can be used for performing this indexing operation, and as shown in FIG. 9, the indexing operation is performed by means of a friction clutch, or the like, 260 having driving and driven sections 262 and 264. The driving section 262 is continually rotated by a longitudinally extending shaft 266 that in turn is driven from the shaft 256 by a pair of driving pinions 268. The driven section 264 of the clutch member 260 is provided with a cam surface 270 having a plurality of depressions 272 therein that are spaced apart by angular distances corresponding to the angular spacing of the teeth to be formed in the workpiece 230. A roller detent 274 is mounted on the horizontal leg of an L-shaped support 276, and the roller detent 274 is biased downwardly to ride into the depressions 272 by means of a coil spring 278 positioned between a shoulder 280 on the L-shaped support and the bottom of a recess 282 in a stationary member 284. The driving section 262 carries a camming dog 286 in such a position as to engage the roller 274 and cam it out of a depression 272 once during each revolution of a shaft 256 and corresponding reciprocation of the carriage 214. The camming dog 286 is positioned to cam the roller 274 out of the depressions 272 at the point of the rearward or return stroke of the carriage 214 wherein the tool 258 just rides clear of the workpiece 230. The pin 254 is so located relative to the shaft 256 that the tool 258 moves out of engagement with the workpiece 230 when the pin 254 has moved approximately 30 degrees counterclockwise from its bottom center position. Thereafter the driving member 262 turns with the driven section 264 for a number of degrees corresponding with the tooth spacing, and the rotation of the driven section 264 is transmitted to the shaft 232 through a pair of universal joints 288 and a splined shaft arrangement 290. The splined shaft arrangement 290 is made necessary by reason of the fact that the shaft 232 is reciprocated with the carriage 214 while the driven section 264 of the friction clutch 260 remains stationary.

FIGURE 10 of the drawings shows the tool 258 in a position where it is working upon the first of the series of three teeth. At this time the roller 274 is positioned in the second depression 272 as seen in FIGURE 11. When the roller 274 engages the last or most clockwise depression 272, the last of the three teeth of the workpiece 230 is rotated into position to be worked upon by the tool 258. At the time during the return stroke of the carriage 214 that the tool 258 moves out of engagement with the workpiece 230, the camming dog 286 rides underneath the roller to raise it out of the last depression 272, whereupon the driving and driven sections 262 and 264 of the clutch rotate together for approximately 270°. During this 270° of roation, the carriage 214 will move the workpiece 230 past the tool 258 free and clear of the teeth 230. During the return stroke of the carriage 214, the roller 274 drops into the first depression 272 to hold the first tooth of the workpiece 230 free and clear of the tool 258 until the pin 254 reaches a position approximately 30° to the right of bottom center, wherein the tool 258 moves free and clear of the workpiece 230. The camming dog 286 will, of course, continue to be moved after the roller detent rides into the first depression 272, so that shortly after the pin 254 reaches the position wherein the tool 258 is out of engagement with the workpiece 230, camming dog 286 cams the roller 274 out of the first depression 272. The driven section 264 then rotates with the driving section 262 of the clutch to bring the first tooth of the workpiece 230 into position for rolling contact by the tool 258 during the next forward stroke of the carriage 214.

The details of the rolling tool 258 and its method of attachment to the spindle 220 can be generally that of the previously described embodiment. The tool 258 will differ from that of the previous embodiment, however, in that its outer contour can be generally cylindrical, inasmuch as it always performs its maximum work upon the workpiece 230 at a position directly below the center line of the tool spindle 220. Gear forming surfaces of the tool 258 are positioned well below the pitch line of the rack 224, so that an appreciable amount of sliding action accompanies the rolling action of the tool 258 as it passes across the surface of the workpiece 230. It will be seen that when the carriage 214 is moved a distance corresponding to one tooth spacing of the rack 224, the pinion gear 228 at its pitch line will be rotated by an angle whose chordal distance on the pitch line equals the travel of the carriage 214. Inasmuch as the work forming surfaces of the tool 258 are positioned radially outwardly from the pitch line rotation of the pinion gear 228 corresponding to one tooth spacing causes the work forming surfaces of the tool 258 to move a greater chordal distance than the chordal distance at the pitch line. Consequently, the work forming surfaces of the tool 258 move a greater distance than does the workpiece 230 and a sliding, burnishing action accompanies the rolling action of the tool 258.

It is desired that the work 230 will be fed up into the tool 258 by a predetermined increment after the time that the last tooth of the series has been rolled, and during the time that the workpiece is being revolved to bring the first of the series of teeth into position for rolling contact by the tool 258. This is accomplished in the embodiment shown, by a pin 292 located on the driven section 264 so as to contact the top of a gear 294 at some time during the approximately 270° of rotation when the tool 258 makes a free pass over the workpiece. The gear 294 is splined to the shaft 248 to accommodate the reciprocating motion of the carriage 214, and the rotation of the gear 294 rotates the thrust nut 240 to feed the workpiece 230 upwardly relative to the tool supporting spindle 220.

Figure 12:
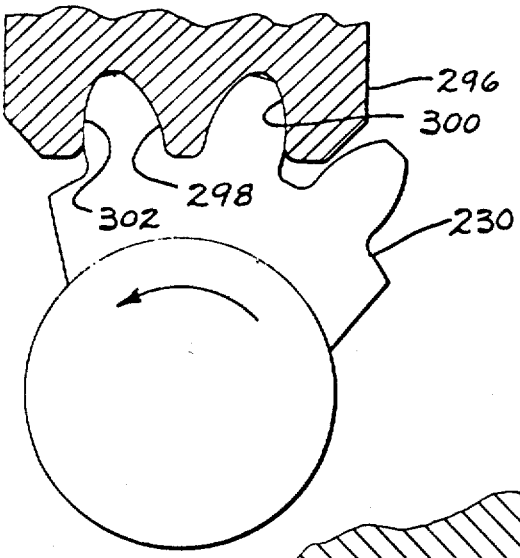
FIGURE 12 is a fragmentary view showing another embodiment of male rolling tool in engagement with a gear sector.
Figure 13:
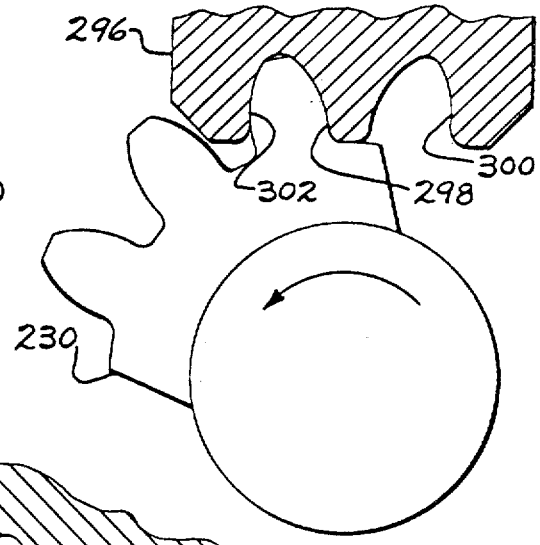
FIGURE 13 is a fragmentary view similar to FIGURE 12 showing the gear sector turned to a position wherein its last tooth is worked upon by the male rolling tool.

In the machines so far described, the indexing mechanism of the machines is generally depended upon to provide the tooth spacing that is produced by the rolling tool. In some instances it will be desirable to provide a rolling tool having surfaces which determine the spacing of the teeth independently of the indexing action of the mechanism which supports and drives the rolling tool relative to the work. FIGURES 12 and 13 of the drawings show a male tool 296 having a projecting surface 298 which rolls and burnishes the adjacent faces of opposite teeth as well as their roots. The tool 296 also includes guiding surfaces 300 and 302 which abut the opposite faces of adjacent teeth to hold them in position as the projecting surface 298 rolls and burnishes the cooperating surfaces of the adjacent teeth. In the first rolling pass of the tool 296 across the gear sector 230, the right hand portion of the projecting surface 298 as seen in FIGURE 12, will abut the left hand surface of the first tooth to roll and burnish its root, while the opposite face of the first tooth is abutted by the guiding face 300. FIG 13 of the drawings shows the tool 296 making its pass over the last tooth so that the left hand surface of the projecting surface 298 rolls and burnishes the right hand face of the last tooth while the guiding face 302 holds the last tooth in position.

Figure 14:
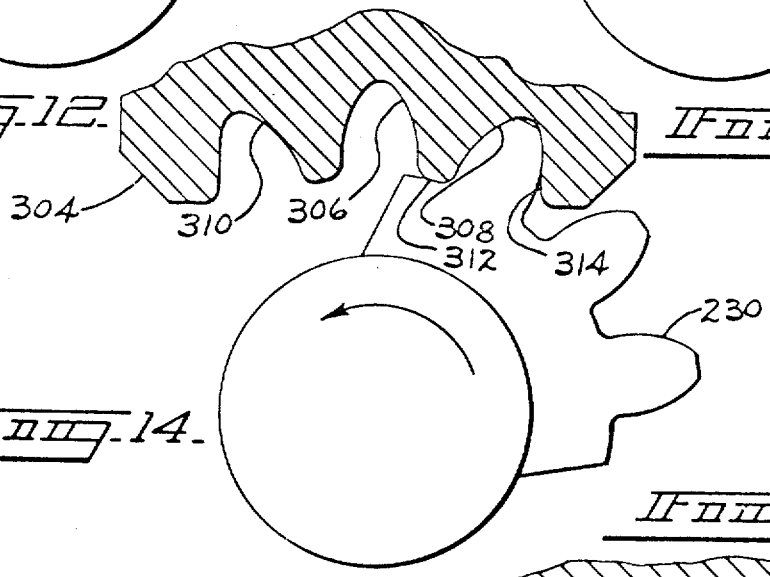
FIGURE 14 is a fragmentary view showing still another embodiment of female rolling tool in position to roll and burnish the first tooth of a gear sector.
Figure 15:
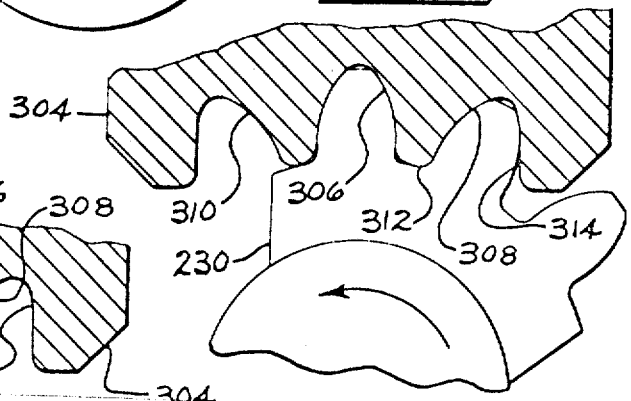
FIGURE 15 is a fragmentary view similar to FIGURE 14 showing the gear sector in position for the female tool to roll and burnish the second tooth.
Figure 16:
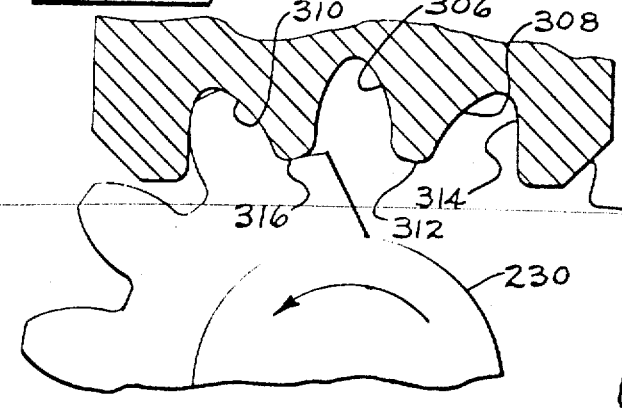
FIGURE 16 is a fragmentary view similar to FIGURES 14 and 15 but showing the gear sector in position for the female tool to roll and burnish the trailing surface of the last tooth of the gear sector.

FIGURES 14 through 16 of the drawings show a female tool 304 having a center depression 306 which rolls and burnishes the opposite faces of a single tooth. Inasmuch as the teeth being formed have a slight undercut or negative rake at their root, it is impossible for the depression 306 to roll the root surfaces on opposite sides of the tooth being formed. It is necessary, therefore, that the female tool 304 include depressions 308 and 310 on opposite sides of the depression 306, so that the projection 312 between the depressions 306 and 308 will roll and burnish the root on the leading face of a tooth, while the trailing surface 314 of the depression 308 holds the tooth in position. FIGURE 14 of the drawings shows the first pass of the tool 304 across the gear teeth to form the root of the leading edge of the first tooth. FIGURE 15 of the drawings shows the tool 304 forming the opposite faces of the first tooth, while the depression 308 holds and supports the second tooth in position relative to the first tooth. Thereafter succeeding passes will cause the depression 306 to roll and burnish opposite faces of the next succeeding two teeth. A projection 316 between the depressions 306 and 310 rolls the root of the trailing edge of the teeth, and FIGURE 16 shows the projection 316 rolling the root at the trailing surface of the last tooth while the tooth is confined within the surfaces of the depression 310.

It will be apparent that the objects heretofore enumerated as well as others have been accomplished, and that there has been provided a method and apparatus for simultaneously rolling and burnishing a gear to provide a surface finish that is better than that provided by a grinding operation; and that there has further been provided a new and improved gear whose root is both cold worked and given a superior finish that makes the gear stronger than those produced by prior art gear forming operations. As used in the appended claims, the word "workpiece" is intended to be directed to gears, splines and similar toothed pieces, and not to peripherally continuous objects.

While the invention has been described in considerable detail, I do not wish to be limited to the particular embodiments shown and described, and it is my intention to cover hereby all novel adaptations, modifications and arrangements thereof which come within the practice of those skilled in the art to which the invention relates.

What I claim is:

1. In a machine for contouring the surface of a workpiece to a predetermined depth, a frame, a tool supporting shaft carried by said frame for rotation about an axis, a work forming tool rotated by said shaft, said tool having a work forming surface for embedment into the workpiece, first means for supporting the workpiece so that said work forming surface of said tool projects into said workpiece to a predetermined depth, and second means to provide relative movement between said work forming surface of said tool and the surface of the workpiece in a direction perpendicular to the axis of rotation of said tool during rotation of said shaft so that said work forming surface of said tool produces a rolling, burnishing action at said predetermined depth in the workpiece.

2. In a machine for contouring the surface of a workpiece to a predetermined depth, a frame, a tool supporting shaft carried by said frame for rotation about an axis, a work forming tool rotated by said shaft, said tool having a work forming surface for embedment into the workpiece, first means for supporting the workpiece so that said work forming surface of said tool projects into said workpiece to a predetermined depth, and second means to provide relative movement between said work forming surface of said tool and the surface of the workpiece in a direction perpendicular to the axis of rotation of said tool during rotation of said shaft so that said work forming surface of said tool produces a rolling burnishing action throughout the full penetration of said work deforming surface into the workpiece.

3. In a machine for contouring the surface of a workpiece to a predetermined depth, a frame, a first member on said frame and having gear teeth with a predetermined pitch line, a pinion gear meshing with said gear teeth of said first member, said pinion gear revolving about an axis positioned to one side of said pitch line, and said first member and pinion gear being movable relative to each other along a path which keeps rolling contact between said pinion gear and first member along said line of contact, a work forming tool having a work forming surface for embedment into the workpiece, shaft means connecting said tool and said pinion gear and supporting said tool with said work forming surface located entirely to one side of the pitch line, and means for supporting the workpiece in a position so that said surface embeds into the workpiece to a predetermined depth, whereby a sliding, rolling action is established between the work forming surface of said tool and the workpiece at the predetermined depth.

4. In a machine for contouring the surface of a workpiece to a predetermined depth, a frame, a first member supported by said frame and having gear teeth with a predetermined pitch line, a pinion gear meshing wtih said gear teeth of said first member, said pinion gear revolving about an axis positioned to one side of said pitch line, and said first member and pinion gear being movable relative to each other along a path which keeps rolling contact between said pinion gear and first member along said pitch line, means for supporting a workpiece in such manner that all of its predetermined depth to be contoured is positioned to one side of said pitch line, a work forming tool having a work forming surface for contouring the workpiece, means connecting said tool and said pinion gear for enabling said tool to rotate with said pinion gear and supporting said tool with the work forming surface located entirely on the same side of said pitch line as the workpiece, whereby said tool produces a metal forming operation for the full depth of its penetration into said workpiece by a combination rolling and burnishing action.

5. In a machine for contouring the surface of a workpiece to a predetermined depth, a frame, a first member supported by said frame and having gear teeth with a predetermined pitch line, a pinion gear meshing with said gear teeth of said first member, said pinion gear revolving about an axis positioned to one side of said pitch line, and said first member and pinion gear being movable relative to each other along a path which keeps rolling contact between said pinion gear and first member along said pitch line, means for supporting a workpiece in such manner that all of its predetermined depth to be contoured is positioned to the other side of said pitch line from said axis of said pinion gear, a work forming tool having a work forming surface for contouring the workpiece, means connecting said tool and said pinion gear for enabling said tool to rotate with said pinion gear and supporting said tool with the work forming surface located entirely on the same side of said pitch line as the workpiece, whereby said tool causes contouring of said workpiece by a combinaiton rolling and burnishing action.

6. In a machine for contouring the surface of a workpiece to a predetermined depth, a frame, a rack member on said frame and having gear teeth with a predetermined pitch line, a pinion gear member meshing with said gear teeth of said rack member, said pinion gear revolving about an axis positioned to one side of said pitch line, and said rack member and pinion gear being movable relative to each other along a path which keeps rolling contact between said pinion gear and rack member, a work forming tool rotated by said pinion gear, said tool having a work forming surface for embedment into the workpiece, means positioning said tool with the entire work forming surface on the opposite side of said pitch line from said pinion gear, and means for supporting the workpiece in fixed relation to one of said rack member and said gear member axis so that said surface embeds into the workpiece to a predetermined depth, whereby said tool and last mentioned means produce a sliding, rolling action between the surface of said tool and the workpiece throughout the full penetration of said work-forming surface into the workpiece.

7. In a rolling and burnishing machine, a tool supporting spindle rotatable about a longitudinal spindle axis, said spindle having a sector shaped tool receiving opening with transverse sides spaced a predetermined longitudinal distance apart and longitudinally extending side surfaces which extend between said transverse sides and form an angle of approximately ninety degrees to each other, a rolling tool for mounting in said recess, said tool having an inner end with abutment surfaces forming an angle substantially equaling that of said longitudinally extending side surfaces of said tool recess, and having an outer end extending generally transversely of said spindle for contouring a workpiece during rotation of said spindle, fastening means securing said tool to said spindle in a direction generally bisecting the angle between said longitudinally extending side surfaces of said tool recess to cause bearing forces to be transmitted between said abutment surfaces of said tool and said longitudinally extending side surfaces of said tool recess, at least one of the adjacent transverse sides of said recess and tool being tapered relative to the other surface, and a wedge tightened into position between said transverse surfaces that are tapered relative to each other to lock said tool between said transverse walls of said tool receiving opening.

8. In the rolling and burnishing machine of claim 7: a rolling tool formed in two half sections which abut each other along a transverse surface, the outer end of said half sections forming a generally radially inwardly extending recess for forming the work with the radially innermost portion of said recess generally occurring at said abutting surfaces of said half sections of said tool.

9. In the rolling and burnishing machine of claim 7: a wedge having tapered transverse sides whose radially outermost portion is closer together than their radially innermost portion, and said adjacent transverse sides of said recess and tool are similarly tapered, and means biasing said wedge radially outwardly to lock said tool in said spindle.

10. In the rolling and burnishing machine of claim 7: a pair of replaceable shims positioned between said longitudinally extending side surfaces of said tool recess and said abutment surfaces of said tool.

11. In a machine for rolling and burnishing rough cut gear teeth to a predetermined depth in a workpiece, a frame, a tool-supporting shaft carried by said frame for rotation about an axis, a work forming tool rotated by said shaft, and means for supporting the workpiece so that said work forming surface of said tool can project into said workpiece to a predetermined depth, said tool having a peripheral surface with at least two generally circumferentially extending grooves that form two sets of oppositely facing side surfaces, one set of oppositely facing side surface of said grooves being spaced to cold work and burnish a pair of oppositely facing surfaces of a pair of gear teeth, and the other set of oppositely facing side surfaces of said grooves being spaced to confine the other set of oppositely facing surfaces of said pair of gear teeth.

12. In a machine for rolling and burnishing rough cut gear teeth to a predetermined depth on a workpiece, a frame, tool-supporting means carried by said frame for rotation about an axis, a work forming tool rotatably carried by said supporting means, and means for supporting the workpiece so that said work forming surface of said tool can project into said workpiece to a predetermined depth, said tool having a peripheral surface with two generally circumferentially extending tooth receiving grooves which form two sets of oppositely facing side surfaces, said tool having a radially outwardly extending projection between said grooves and the side surfaces of which projection form one set of oppositely facing side surfaces, said projection being adapted to cold work and burnish adjacent side surfaces and the root of adjacent gear teeth while the other set of oppositely facing side surfaces abut the most spaced apart surfaces of adjacent gear teeth to hold the gear teeth in position while said projection works upon the adjacent faces and root of said adjacent gear teeth.

13. In a machine for cold working rough cut gear teeth and the like in a workpiece, which teeth have a negative rake portion adjacent their roots, a frame, means carried by said frame for supporting a tool for rotation about an axis, a work forming tool carried by said means, and means for supporting the workpiece for engagement with the tool, said tool having a leading, a middle, and a trailing generally circumferentially extending tooth receiving grooves, said tool having a first projection forming adjacent side surfaces of said leading and middle grooves, and a second projection forming adjacent side surfaces of said middle and trailing grooves, said side surfaces of said middle groove being adapted to cold work the outer side surfaces of a gear tooth positioned in said middle groove while said second projection cold works the leading negative rake portion of a gear tooth whose sides are held by the side surfaces of said trailing groove, and said first projection being adapted to cold work the trailing negative rake portion of a tooth positioned against the side surfaces of said leading groove while a trailing tooth is held by the side surfaces of said middle groove.

*14. An oscillating tool for displacing metal to form teeth on a workpiece, comprising:*

*(a) said tool being in the form of a sector in the plane of oscillation, the length of said tool in the plane of oscillation being longer than the length of the tooth being formed on the workpiece;*

*(b) said tool having a root portion and a tooth portion;*

*(c) said tooth portion having at least two workpiece engaging grooves and formed by two outer projections, and at least one intermediate projection;*

*(d) said grooves forming two sets of oppositely-facing side surfaces;*

*(e) said intermediate projection being adapted to engage and oscillatively burnish adjacent side surfaces of adjacent gear teeth of a workpiece and the root therebetween, while the outermost oppositely-facing side surfaces engage outer surfaces of said adjacent gear teeth; and*

*(f) at least one tapered edge surface, being in said plane of oscillation, extending substantially from said tooth portion to the outermost edges of said root portion, adapted to be held by a matching tapered spacer whereby said tool can be adjusted for compensation.*

References Cited

The following references, cited by the Examiner, are of record in the patented file of this patent or the original patent.

UNITED STATES PATENTS

| | | | |
|---|---|---|---|
| 379,202 | 3/1888 | Kindl | 72—189 |
| 412,383 | 10/1889 | Gould | 72—192 |
| 873,997 | 12/1907 | Ebinghaus et al. | 72—192 |
| 1,273,125 | 7/1918 | Anderson | 72—192 |
| 1,326,865 | 12/1919 | Hoagland | 29—105 |
| 1,529,917 | 3/1925 | Redinger | 29—105 |
| 1,935,775 | 11/1933 | Halborg | 90—10 |
| 2,062,696 | 12/1936 | Brown | 29—90.90 |
| 2,808,742 | 10/1957 | Ives | 72—216 |
| 3,094,888 | 6/1963 | Grob | 72—216 |
| 3,096,669 | 7/1963 | Tremblay | 72—216 |

MILTON S. MEHR, Primary Examiner

U.S. Cl. X.R.

29—90.3, 159.2